United States Patent
Sharma

(10) Patent No.: US 11,972,311 B2
(45) Date of Patent: Apr. 30, 2024

(54) ARTIFICIAL INTELLIGENCE BASED INTEGRATION FRAMEWORKS

(71) Applicant: Paymentus Corporation, Charlotte, NC (US)

(72) Inventor: Dushyant Sharma, Waxhaw, NC (US)

(73) Assignee: PAYMENTUS CORPORATION, Charlotte, NC (US)

( * ) Notice: Subject to any disclaimer, the term of this patent is extended or adjusted under 35 U.S.C. 154(b) by 193 days.

(21) Appl. No.: 17/452,267

(22) Filed: Oct. 26, 2021

(65) Prior Publication Data

US 2023/0129050 A1    Apr. 27, 2023

(51) Int. Cl.
| | |
|---|---|
| G06F 9/54 | (2006.01) |
| G06F 40/20 | (2020.01) |
| G06N 20/00 | (2019.01) |

(52) U.S. Cl.
CPC .............. *G06F 9/548* (2013.01); *G06F 40/20* (2020.01); *G06N 20/00* (2019.01); *G06F 9/541* (2013.01)

(58) Field of Classification Search
None
See application file for complete search history.

(56) References Cited

U.S. PATENT DOCUMENTS

| | | | |
|---|---|---|---|
| 10,706,030 B2 | 7/2020 | Ghatage et al. | |
| 11,126,635 B2 | 9/2021 | Behzadi et al. | |
| 2016/0048442 A1* | 2/2016 | Chirravuri | G06F 8/73 |
| | | | 717/124 |
| 2019/0196811 A1* | 6/2019 | Bahrami | G06F 8/10 |
| 2020/0004751 A1 | 1/2020 | Stennett et al. | |
| 2020/0380386 A1 | 12/2020 | Dinh et al. | |
| 2021/0064453 A1* | 3/2021 | Bahrami | G06F 16/986 |

OTHER PUBLICATIONS

International Search Report and Written Opinion for PCT/US2021/056615 (ISA/EP) dated Jul. 14, 2022 (18 pages).

* cited by examiner

*Primary Examiner* — Syed A Roni
(74) *Attorney, Agent, or Firm* — ALSTON & BIRD LLP

(57) ABSTRACT

Methods, apparatuses, and systems are described for artificial-intelligence based techniques for programmatically generating and integrating application programming interfaces (APIs). An example method may include, in response to receiving by one or more processors, an integration data object, processing, by the one or more processors, based at least in part on an integration machine learning model, the integration data object in order to identify one or more integration features associated with the integration data object; programmatically generating, by the one or more processors, based at least in part on the one or more integration features, an application programming interface (API) model corresponding with the integration data object; and generating, by the one or more processors, an API generation data object corresponding with the API model for execution.

18 Claims, 6 Drawing Sheets

| | FIELD NAME | DATA TYPE | DATA FORMAT | FIELD SIZE | DESCRIPTION | EXAMPLE |
|---|---|---|---|---|---|---|
| 401A | Customer No. | Integer | XXXXXXXX | 8 | Unique Customer Number For Account Holder | 87389093 |
| 401B | Last Name | Text | | 25 | Account Holder's Last Name | Smith |
| 401C | First Name | Text | | 25 | Account Holder's First Name | Jane |
| 401D | Phone Number | Integer | XXXXXXXXXX | 10 | Account Holder's Phone Number | 7040001001 |
| 401E | Address | Text | | 60 | Account Holder's Home Address | 13024 Ballantyne Corporate Pl, Charlotte, North Carolina, 28277 |
| 401F | Current balance | Currency | XXX.XX | 10 | Account Holder's Current Account Balance In USD | 213.76 |

# ARTIFICIAL INTELLIGENCE BASED INTEGRATION FRAMEWORKS

TECHNICAL FIELD

An example embodiment relates generally to electronic communication technology, particularly in the context of application programming interface (API) development, integration and implementation.

BACKGROUND

In a variety of applications, an API may facilitate communication and data exchange between software products and software services that are associated with different entities. An example API may be implemented as an intermediary layer between an application and a server that processes and transfers data therebetween. For example, utilizing an API, a provider may provide data to an external third-party system in order to facilitate provision of services and products that may be provided by the third-party system (e.g., a payment processing service). Additionally, in some embodiments, APIs may operate to provide enhanced data security (e.g., by providing encryption layers and the like).

In various examples, implementation of an API solution requires integration between two or more systems and/or software platforms so that they can share data/information with one another. By way of example, an application (e.g., a client application) may initiate an API call or request to an API to retrieve information. In response to receiving and validating the API call or request, the API may in turn call an external server or program and obtain the requested information from the external server or program. Subsequently, the API may transfer the data to the requesting application (e.g., client application).

Conventional systems, method and apparatuses for integrating APIs typically require manual development of an API through an iterative process of writing and compiling computer code by one or more software developers. A provider seeking to implement an API/API solution in order to provide a third-party service may provide a specification describing target functions, data structures (e.g., a data dictionary defining data types/definitions), data structure attributes associated with provider database(s) and the like. In some cases, a specification may be unavailable or out of date, further prolonging the development process. For example, where a specification is not available, software developer(s) may analyze and/or map aspects of the provider's system/platform in order to generate a data structure and/or target functions.

In another example, software developer(s) may utilize pre-built API templates in order to develop an API. However, such templates generally require additional customization and testing in order to function properly. In many examples, software developer(s) may need to iteratively deploy testing APIs throughout the integration process, requiring additional resources and time. Accordingly, known development methods, even with the use of pre-built API templates, may be inefficient and time consuming requiring a large amount of computing resources and skilled labor to ensure system stability and functionality of the deployed API.

The inventor of the invention disclosed herein has identified these and other technical challenges and has developed the solutions described and otherwise disclosed herein.

SUMMARY

Methods, apparatuses, systems and computer program products are therefore provided in accordance with example embodiments to, for example, programmatically generate and integrate APIs using artificial intelligence/machine learning techniques and the like.

According to a first embodiment, a method is provided. The method can comprise, in response to receiving, by one or more processors, an integration data object, processing, by the one or more processors, and based at least in part on an integration machine learning model, the integration data object in order to identify one or more integration features associated with the integration data object; programmatically generating, by the one or more processors, and based at least in part on the one or more integration features, an application programming interface (API) model corresponding with the integration data object; and generating, by the one or more processors, an API generation data object corresponding with the API model for execution.

In some embodiments, the API generation data object is configured to facilitate generation and/or modification of an API and/or one or more API-based data objects.

In some embodiments, the method can further comprise, subsequent to programmatically generating the API model, periodically sending requests for integration information for updating and/or refining the API model.

In some embodiments, the integration machine learning model comprises a trained supervised machine learning model that is trained based at least in part on a plurality of historical integration data objects.

In some embodiments, the one or more integration features comprises one or more of a data structure, a predicted API type, a country and a language.

In some embodiments, processing, by the one or more processors, the integration data object comprises performing textual analysis on at least a portion of the integration data object.

In some embodiments, the one or more API-based data objects are provided in association with a payment processing service.

According to a second embodiment, an apparatus is provided. The apparatus can comprise a processor; and a memory storing program code, the memory and the program code being configured, with the processor, at least to: in response to receiving an integration data object, process, based at least in part on an integration machine learning model, the integration data object in order to identify one or more integration features associated with the integration data object; programmatically generate, based at least in part on the one or more integration features, an API model corresponding with the integration data object; and generating, by the one or more processors, an API generation data object corresponding with the API model for execution.

In some embodiments, the API generation data object is configured to facilitate generation and/or modification of an API and/or one or more API-based data objects.

In some embodiments, the memory and the program code are further configured, with the processor, at least to: subsequent to programmatically generating the API model, periodically send requests for integration information for updating and/or refining the API model.

In some embodiments, the integration machine learning model comprises a trained supervised machine learning model that is trained based at least in part on a plurality of historical integration data objects.

In some embodiments, the one or more integration features comprises one or more of a data structure, a predicted API type, a country and a language.

In some embodiments, processing the integration data object comprises performing textual analysis on at least a portion of the integration data object.

In some embodiments, the one or more API-based data objects are associated with a payment processing service.

According to a third embodiment, a computer program product is provided. The computer program product can comprise a non-transitory computer readable medium storing program instructions, the program instructions being operable for causing at least: in response to receiving an integration data object, processing, based at least in part on an integration machine learning model, the integration data object in order to identify one or more integration features associated with the integration data object; programmatically generating, based at least in part on the one or more integration features, an API model corresponding with the integration data object; and generating an API generation data object corresponding with the API model for execution.

In some embodiments, the API generation data object is configured to facilitate generation and/or modification of an API and/or one or more API-based data objects.

In some embodiments, the program instructions are further operable for causing at least: subsequent to programmatically generating the API model, periodically sending requests for integration information for updating and/or refining the API model.

In some embodiments, the integration machine learning model comprises a trained supervised machine learning model that is trained based at least in part on a plurality of historical integration data objects.

In some embodiments, the one or more integration features comprises one or more of a data structure, a predicted API type, a country and a language.

In some embodiments, processing the integration data object comprises performing textual analysis on at least a portion of the integration data object.

BRIEF DESCRIPTION OF THE DRAWINGS

FIG. 4 is a schematic diagram illustrating a data structure, according to one or more aspects of the currently disclosed invention.

DETAILED DESCRIPTION

Figure 1:
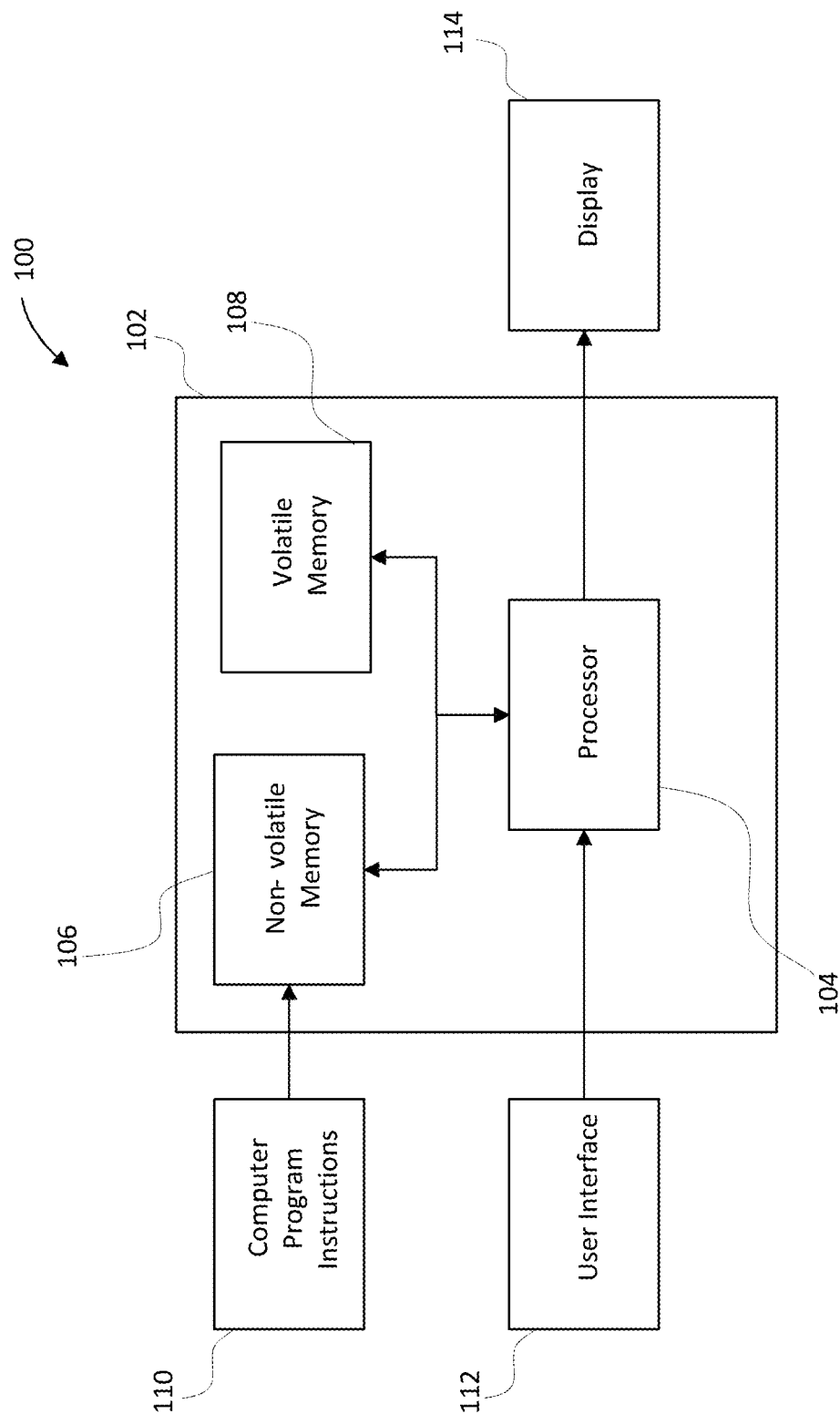
FIG. 1 is an apparatus diagram illustrating an integration computing entity for carrying out one or more aspects of the currently disclosed invention.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

As used herein, the term "integration" may refer to the process of installing and configuring an application with a provider system/platform such that the provider system/platform can communicate with and/or exchange data with the third-party application or service application in order to provide a service with one or more functionalities.

As used herein, the term "integration data object" may refer to a data object that describes one or more integration features (e.g., that are associated with a provider and/or provider platform) with respect to which one or more data analysis and/or integration operations are performed. For example, an integration data object may be processed to generate an API in order to integrate a provider platform with a service provider platform (e.g., third-party platform) via an API to facilitate access to one or more services provided by the service provider platform. In some examples, the integration data object may be or comprise a specification describing security layers, system protocols, provider requirements and/or target functionalities. In some examples, the integration data object may describe a network endpoint or resource with which a communication link must be established in order to achieve integration between a provider platform and a service provider platform. In other examples, the integration data object may be or comprise unstructured data (e.g., a document). By way of example, if the provider is a utility company, the integration data object may comprise one or more account statements, invoices, bills and/or the like.

As define herein, the term "integration machine learning model" may refer to a data object that describes operations and/or parameters of a machine learning model that is configured to process an integration data object in order to generate an API model. An integration machine learning model may comprise a plurality of machine learning models and/or machine learning model components. For example, an integration machine learning model may include one or more of a trained supervised machine learning model, similarity determination machine learning model, convolutional neural network model, a language-based model, and/or the like. The integration machine learning model may be trained utilizing a plurality of historical integration data objects. For example, the plurality of historical integration data objects may be or comprise a plurality of documents and/or other unstructured data, wherein each historical integration data object is associated with a particular provider system/platform type and/or a plurality of integration features. By way of example, integration features may include an API model type or service type, a country, a spoken or written language and/or the like.

As defined herein, the term "API model" may refer to a data object that describes operations/parameters of an API that are configured to facilitate provision of one or more services and may comprise data/information (e.g., computer-executable code) required to integrate a third-party application or third-party service. By way of example, an API model may be associated with a particular set of functionalities. For instance, a payment service may be associated with a payment gateway facilitating transfer of information between a payment portal and a bank. In another example, a user registration service may facilitate credentialing or sign-in to a provider platform via a third-party credentialling system. In another example, a translation service may facilitate conversion of textual information from a first language to a target language. Other types of API models include, but are not limited to, a mapping service, a document management service, a search service or the like. In various embodiments, a particular API model may be associated with a written/spoken language (e.g., English, French, Danish), a country, a computer/software language (e.g., Java, JavaScript, Python, PHP, .NET, Dart, Objective-C, Ruby, Go, Node.js or the like). Additionally, an example API model may be associated with a data structure defining one or more data types and one or more data operations that can be performed in relation to each data type. An example data structure may further define a methodology for organizing, storing, retrieving and processing data.

As used herein, the terms "service provider application" or "third-party application" may refer to a software program, platform, or service that is configured to provide a service to one or more client devices in conjunction with another system/platform (e.g., a provider system/platform) via a communication interface. The service provider application may operate on a compiled code base or repository that is separate and distinct from that which supports the provider system/platform. In some embodiments, the service provider application may communicate with the provider system/platform utilizing an API. For example, a service provider application may be a Software as a Service ("SaaS") product or an Application ("App") product that is provided by a third-party application provider and which is stored and maintained by the third-party application provider.

As used herein, the term "third-party application provider" may refer to a provider of a service provider application by way of a remote networked device, such as a server or processing device, maintained by a third-party individual/entity, company, or organization. A client device associated with a provider system may access a service provider application provided by the third-party application provider to execute functions, flows, or actions. In some embodiments, the functions, flows, or actions produce an effect (e.g., an output, change, data modification, etc.) within the group-based communication system such as, for example, by manipulating data within the provider system (e.g., processing a payment and updating a user's account profile), or executing some other action such as providing content to the provider system for rendering in an interface. In other embodiments, the functions, flows, or actions take effect within the third-party application provider to produce an effect within the third-party application provider. In yet other embodiments, the functions, flows, or actions produce effects within various combinations of the provider system, the third-party application provider, and other servers or systems.

As used herein, the term "API generation data object" may refer to a data object that comprises computer-executable instructions for generating an API and/or for performing integration operations, for example, without limitation, between a provider system (e.g., a utility) and a third-party provider system (e.g., a service provider).

As used herein, the term "API-based data object" may refer to a set of data and/or instructions that represent an item or resource of the provider system/platform. In some embodiments, service applications are permitted to perform actions on one or more API-based data objects. Each API-based data object may be associated with an object identifier that uniquely identifies a particular API-based data object in the provider system and an object type, which describes the category of objects to which the API-based data object belongs. In some embodiments, users may perform actions via a user interface that create or modify API-based data objects. Example API-based data objects include files created and maintained in the provider system, user account information and the like.

The term "client device" may refer to computer hardware and/or software that is configured to access a service made available by a server. In some examples, the server may be associated with another computer system/platform (e.g., a third-party application provider/platform) that provides the service. In such examples, the client device may access the service by way of a network. Client devices may include, without limitation, smart phones, tablet computers, laptop computers, wearables, personal computers, enterprise computers, and the like.

The term "user" may refer to an individual, group of individuals, business, organization, and the like. In various examples, a user may access a service or system utilizing a client device. A user may further be associated with a user identifier such as a unique number (e.g., an integer or string).

The terms "database," "data store" or "data repository" may refer to a location where data is stored, accessed, modified and otherwise maintained by a system. The stored data may comprise user information, account information and/or the like that are associated with a particular provider platform. The example database, data store or repository may be embodied as a data storage device or devices, as a separate database server or servers, or as a combination of data storage devices and separate database servers. In some embodiments, the database, data store or repository may be embodied as a distributed database/repository such that some of the stored data is stored centrally in a location and other data is stored in a single remote location or a plurality of remote locations. Alternatively, in some embodiments, the data may be distributed over a plurality of remote storage locations only.

Embodiments described herein relate generally to systems, methods, apparatuses, and computer program products for programmatically generating and integrating APIs using machine learning techniques and/or artificial intelligence and the like.

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Referring now to FIG. 1, an integration computing entity 100 is illustrated for performing operations that lead to generating and/or integrating an API. The API may be utilized to facilitate a user session via the API and/or another network entity. In some embodiments, the integration computing entity 100 can access a provider system/platform and/or database associated therewith. The integration computing entity 100 can comprise a computing device 102 that includes at least a processor 104 and one or both of a non-volatile memory 106 and a volatile memory 108. In some embodiments, the computing device 102 can be configured such that the processor 104 can be operably coupled to or otherwise in communication with one or both of the non-volatile memory 106 and the volatile memory 108. In some embodiments, the computing device 102 can comprise a laptop computer, a desktop computer, a cloud computing device, a server, a network, a hand-held computer, a mobile computing device, a mobile phone, a personal digital assistant, a tablet computer, any combination thereof, or the like.

In some embodiments, the processor 104 may comprise any electronic circuit configured to perform operations on a memory, such as the non-volatile memory 106 or volatile memory 108 or the like. In some embodiments, the processor 104 can comprise a central processing unit, a graphics processing unit, a vision processing unit, a tensor processing unit, a neural processing unit, a digital signal processor, an image signal processor, a synergistic processing element, a field-programmable gate array, a sound chip, or the like. In some embodiments, the processor 104 can comprise an arithmetic logic unit (not shown), a control unit (not shown), a speed clock (not shown), and the like. In some embodiments, the processor 104 can comprise one or more processing chips, microcontrollers, integrated chips, sockets, systems on a chip (SoC), array processor, vector processor, peripheral processing components, and the like.

In some embodiments, the non-volatile memory 106 can comprise any computer memory or memory device that can retain stored information even when not powered, such a read-only memory (ROM), flash memory, magnetic computer storage devices such as hard disks, floppy discs, magnetic tape, optical discs, FeRAM, CBRAM, PRAM, SONOS, RRAM, Racetrack memory, NRAM, Millipede, combinations thereof, and the like.

In some embodiments, the volatile memory 108 can comprise any computer memory or memory device that requires power to maintain the stored information, such as static random access memory (RAM), dynamic RAM, Z-RAM, TTRAM, A-RAM, ETA RAM, any combination thereof, or the like.

In some embodiments, the processor 104 or another such component of the computing device 102 can be configured to carry out a process or method based on computer program instructions 110. In some embodiments, the computer program instructions 110 can be stored on one of the non-volatile memory 106 and the volatile memory 108. In some embodiments, the computer program instructions 110 can be operable to cause the processor 104 to carry out any of the methods, approaches, processes, or the like disclosed herein. In some embodiments, the computer program instructions 110 can comprise computer-readable instructions, computer code, a coded application, and/or the like.

The integration computing entity 100, the processor 104 (and/or co-processors or any other circuitry assisting or otherwise associated with the processor 104) may be in communication with the memory 106 or 108 via a bus for passing information among components of the integration computing entity 100. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor 104). The memory device may be configured to store information, data, content, applications, instructions, or the like for enabling the apparatus to carry out various functions in accordance with an example embodiment of the present disclosure. For example, the memory device could be configured to buffer input data for processing by the processor 104. Additionally or alternatively, the memory device could be configured to store instructions for execution by the processor 104, such as storing a message to be executed by the processor 104 and displayed on the user interface.

The integration computing entity 100 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processor 104 may be embodied in a number of different ways. For example, the processor 104 may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 104 may include one or more processing cores configured to perform independently. A multi-core processor 104 may enable multiprocessing within a single physical package. Additionally or alternatively, the processor 104 may include one or more processors 104 configured in tandem via the bus to enable independent execution of instructions, pipelining and/or multithreading.

In an example embodiment, the processor 104 may be configured to execute instructions stored in the memory 106 or 108 or otherwise accessible to the processor 104. Alternatively or additionally, the processor 104 may be configured to execute hard coded functionality. As such, whether configured by hardware or software methods, or by a combination thereof, the processor 104 may represent an entity (e.g., physically embodied in circuitry) capable of performing operations according to an embodiment of the present disclosure while configured accordingly. Thus, for example, when the processor 104 is embodied as an ASIC, FPGA or the like, the processor 104 may be specifically configured hardware for conducting the operations described herein. Alternatively, as another example, when the processor 104 is embodied as an executor of instructions, the instructions may specifically configure the processor 104 to perform the algorithms and/or operations described herein when the instructions are executed. However, in some cases, the processor 104 may be a processor 104 of a specific device (e.g., an encoder and/or a decoder) configured to employ an embodiment of the present disclosure by further configuration of the processor 104 by instructions for performing the algorithms and/or operations described herein. The processor 104 may include, among other things, a clock, an arithmetic logic unit (ALU) and logic gates configured to support operation of the processor 104.

In some embodiments, the integration computing entity 100 can further include a communication interface. In some embodiments, the communication interface may be any means such as a device or circuitry embodied in either hardware or a combination of hardware and software that is configured to receive and/or transmit data from/to a network and/or any other device or module in communication with the integration computing entity 100, such as an wireless local area network (WLAN), core network, a database or other storage device, etc. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, the integration computing entity 100 can further comprise a user interface 112 configured such that a user or viewer can input data, information, requests, commands, or the like to the computing device 102 via any suitable input approach. For instance, in some embodiments, the user or viewer may input a command or other suitable inputs verbally, textually, via a signal such as an optical signal or electrical signal, digitally via any suitable computer language, visually, a combination of these, or the like. As such, the user interface 112 can comprise any of a variety of input devices suitable to capture a user's or viewer's input. Some but not all of the suitable input devices are a video camera, a microphone, a digital pointing device such as a mouse or touchpad, an interactive touchscreen, a virtual reality environment, an augmented reality environment, one or more sensors configured to sense a gesture made by the user or viewer, combinations thereof, or the like.

In some embodiments, the processor 104 can be operably coupled to or otherwise in communication with the user interface 112 such that a user or viewer can input data, information, requests, commands, or the like to the computing device 102 via any suitable input approach. By way of example only, in some embodiments, the user interface 112 can comprise a video camera configured to capture video of a user or view, a microphone configured to capture audio from a user or viewer, and an audio/video processing unit configured to interpret gestures, audio, or other types of inputs from the user or viewer and interpret the input as a command, question, data input, or the like.

In some embodiments, the integration computing entity 100 can further comprise a display 114 configured to present media content to a user or viewer. In some embodiments, the display 114 can be operably coupled to or otherwise in communication with the processor 104 or another such component of the computing device 102. In some embodiments, the display 114 can be coupled to or integrated into the same hardware device as the user interface 112 such that the same user or viewer may transmit inputs to the computing device 102 while the computing device 102 can transmit media content to the display 114 to present or cause the display 114 to present the media content to the user or viewer. By way of example only, such an integrated hardware device that comprises the user interface 112 and the display 114 could be an interactive display or monitor, a computer screen, a touch-sensitive display, a head-mounted display, a display with an integrated video camera and/or microphone, a display with an integrated sensor, or a display configured to otherwise capture input information (e.g., sound waves, audio information, commands, data, questions, comments, and the like) from the user or viewer.

In some embodiments, the integration computing entity 100 can be either a server-side device or a user device. In some embodiments, the integration computing entity 100 or a component thereof can be configured to be in wired or wireless communication with a network, a server, telecommunications equipment, a user device, another computing device, another processor, another memory device, and/or a mobile device such as a mobile phone or tablet.

Figure 2:
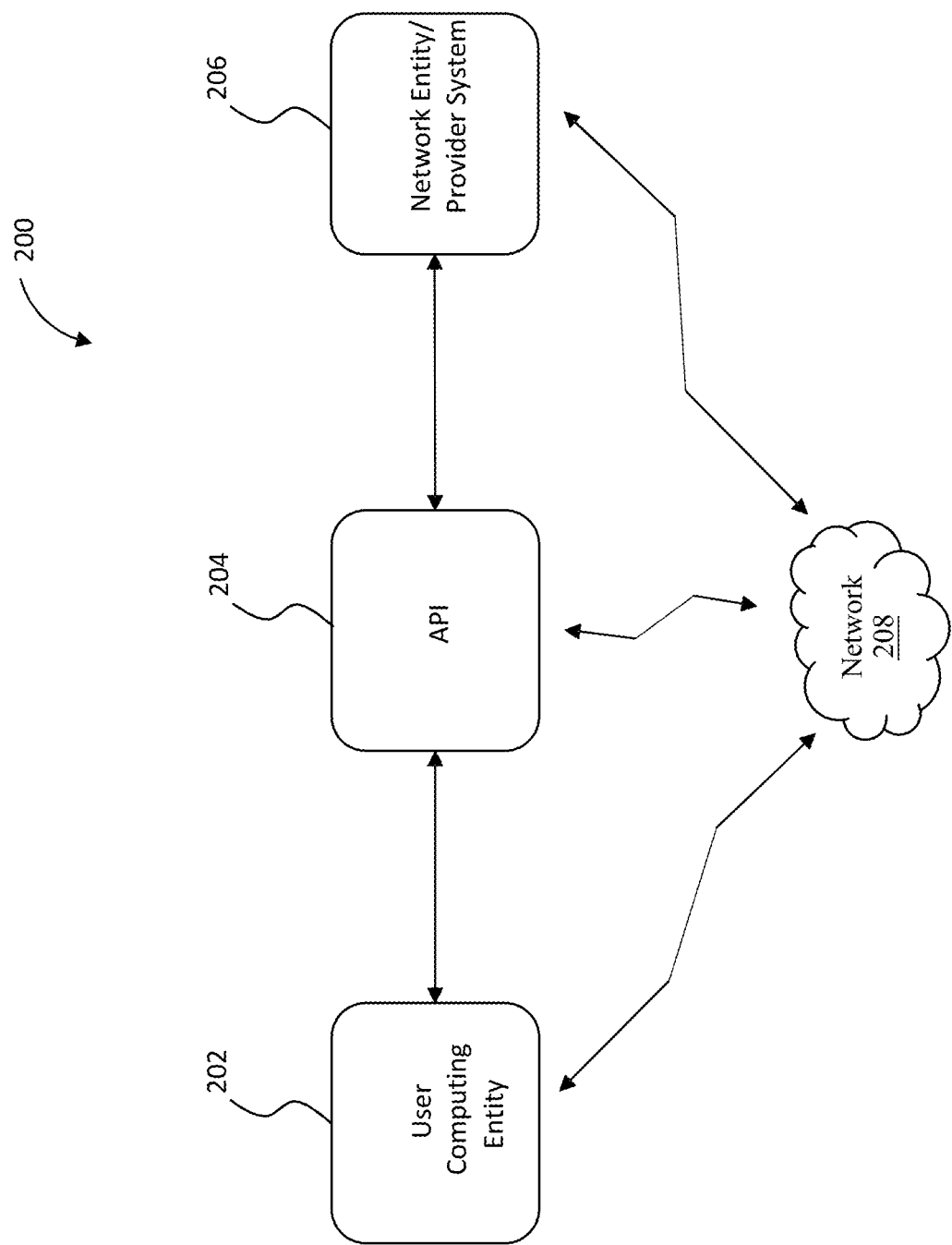
FIG. 2 is a diagram illustrating a system for carrying out one or more aspects of the currently disclosed invention.

Referring now to FIG. 2, an example system 200 is depicted. In some embodiments, user computing entity 202 such as a smart device, can be configured to be in communication with an API 204. In some embodiments, the API 204 can be configured to be in communication with one or more network entities 206, such as a network or database of various organizations or businesses (e.g., a provider system or platform). The one or more network entities 206 may be configured to be in communication and/or provide access to one or more databases via the API 204. In some embodiments, each of the user computing entity 202, API 204, and network entity 206 can be configured to connect to a network 208, such as the Internet, such that communication can be secured and routed along traditional channels of inter-network entity and inter-smart device communication. By way of example only, the network 208 can comprise a distributed mobile network or public land mobile network (PLMN) such that the user computing entity 202 (e.g., smart device) can establish an association or connection directly via the network 208 to any of the API 204, network entity 206, and/or the like. Other suitable networks and communications technologies are described elsewhere herein, and other known network types and communication technologies not disclosed herein are also contemplated. In some embodiments, the network entity 206 may access an API or a data exchange that is configured to retrieve information from one or more databases or network entities. Said another way, a third-party service may establish a secure connection with a network entity 206 or database of a particular company or organization via the API 204 in order to provide a service or function. In some embodiments, the network entity 206 may be configured to generate one or more API-based data objects and may provide (e.g., transmit, send) the one or more API-based data objects to an end user interface for display and/or further operations. The API-based data objects may be used to dynamically update the user interface operated by an end user or generate user interface data in response to queries/requests.

Figure 3A:
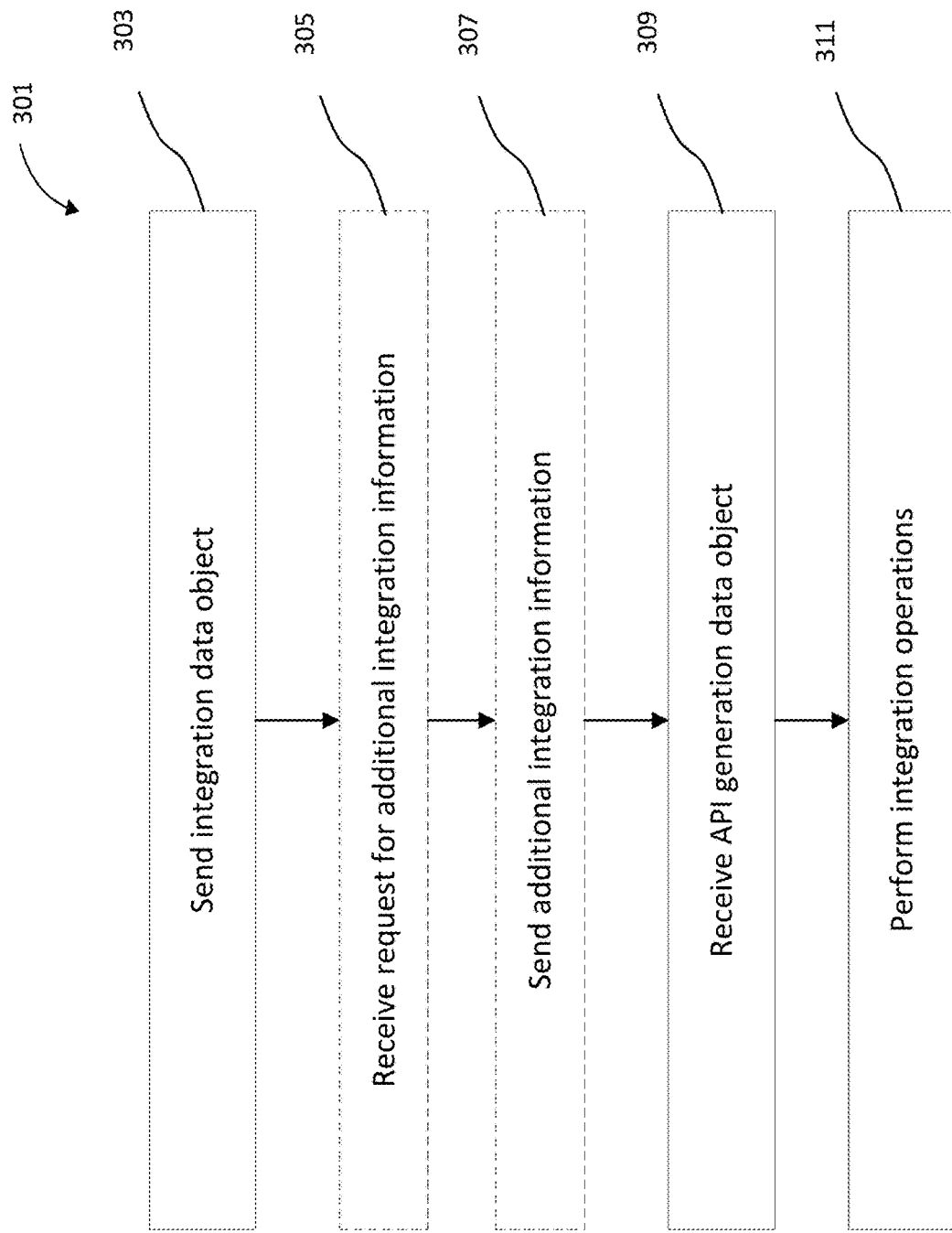
FIG. 3A is a diagram illustrating a method for carrying out one or more aspects of the currently disclosed invention.
Figure 3B:
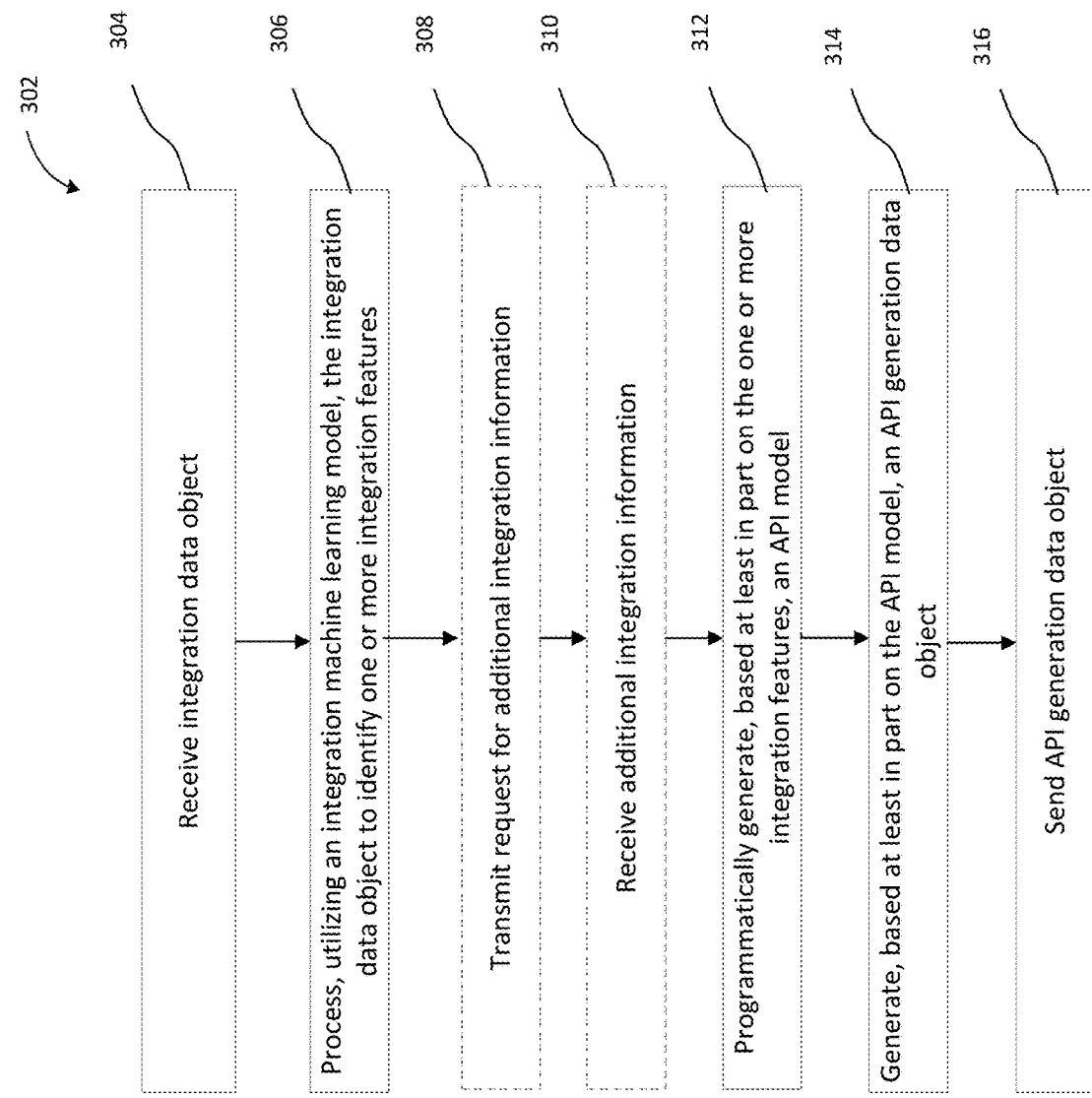
FIG. 3B is a diagram illustrating a method for carrying out one or more aspects of the currently disclosed invention.

Referring now to FIG. 3A and FIG. 3B, example methods 301 and 302 for carrying out one or more aspects of the currently disclosed invention is provided. In some examples, the methods 301 and 302 may be performed by a processing circuitry (for example, but not limited to, an application-specific integrated circuit (ASIC), a central processing unit (CPU)). In some examples, one or more of the procedures described in FIG. 3A and FIG. 3B may be embodied by computer program instructions, which may be stored by a memory (such as a non-transitory memory) of a system employing an embodiment of the present invention and executed by a processing circuitry (such as a processor) of the system. These computer program instructions may direct the system to function in a particular manner, such that the instructions stored in the memory circuitry produce an article of manufacture, the execution of which implements the function specified in the flow diagram step/operation(s). Further, the system may comprise one or more other circuitries. Various circuitries of the system may be electronically coupled between and/or among each other to transmit and/or receive energy, data and/or information.

In some examples, embodiments may take the form of a computer program product on a non-transitory computer-readable storage medium storing computer-readable program instruction (e.g., computer software). Any suitable computer-readable storage medium may be utilized, including non-transitory hard disks, CD-ROMs, flash memory, optical storage devices, or magnetic storage devices.

Referring now to FIG. 3A, a method 301 is provided for carrying out one or more aspects of the currently disclosed invention. The example method 301 begins at step/operation 303. At step/operation 303, a processor (such as, but not limited to, the processor of the network entity 206 (e.g., provider system/platform) illustrated in connection with FIG. 2 discussed above) sends (e.g., provides, transmits) an integration data object. As noted herein, the integration data object may refer to a data object that describes one or more integration features that are associated with a provider and/or provider platform. In some examples, the integration data object may comprise one or more specifications describing security layers, system protocols, provider requirements and/or target functionalities associated with the provider/provider platform. In other examples, the integration data object may comprise unstructured data (e.g., one or more documents). By way of example, if the provider is a utility company, the integration data object may comprise one or more account statements, invoices, bills, webpage information and/or the like. Additionally and/or alternatively, the integration data object may comprise specifications describing security layers, system protocols, provider requirements and/or target functionalities associated with the utility company.

Referring now to FIG. 3B, the example method 302 begins at step/operation 304. At step/operation 304, a processor (such as, but not limited to, the processor of the integration computing entity 100 illustrated in connection with FIG. 1, discussed above) receives the integration data object.

In some embodiments, the integration computing entity 100 processes, utilizing an integration machine learning model, the integration data object to identify one or more integration features at step/operation 306. As noted above, the integration machine learning model may comprise one or more machine learning models or components. For instance, the integration machine learning model may include one or more of a trained supervised machine learning model, similarity determination machine learning model, convolutional neural network model, a language-based model, combinations thereof, and/or the like. By way of example, the integration machine learning model may comprise a language based model configured to process one or more documents using textual analysis including, in some examples, optical character recognition (OCR), in order to extract a plurality of integration features. The integration features may include, by way of example, a predicted API model type or service type, a country, a spoken or written language and/or the like. For example, the integration machine learning model may process a plurality of documents (e.g., bills or account statements, specification(s), webpage data/code, combinations thereof, and/or the like) and determine one or more integration features. As noted above, the integration machine learning model may be trained utilizing a plurality of historical integration data objects. For example, the plurality of historical integration data objects may be or comprise a plurality of documents and/or other unstructured data, wherein each historical integration data object is associated with a particular provider system/platform type and/or a plurality of integration features. By way of example, if the provider platform/system is a utility company the integration machine learning model may process a plurality of documents that are associated with and/or provided by the utility company in order to identify a particular country (e.g., United States), a language (e.g., English and/or Spanish), a predicted API type (e.g., payment service), and a computer code/language (e.g., JavaScript, Python or the like) and a data structure defining one or more data types, one or more data operations that can be performed in relation to each data type and/or a methodology for organizing, storing, retrieving and processing data from a database or repository that is associated with the utility company.

In some examples, the method 302 may include, at step/operation 308, transmitting a request for additional integration information/data required to generate, update or refine an API model. In some embodiments, the integration computing entity 100 may determine that the information described integration data object fails to satisfy a threshold such that one or more integration features associated with the API model cannot be determined. By way of example, the integration computing entity 100 may determine that the integration data object does not contain sufficient information for determining a country, a written/spoken language, a computer language, a data structure, one or more system protocols, combinations thereof, and/or the like. In such examples, the integration computing entity 100 may transmit a request to the network entity 206/provider system for the required integration information.

Returning to FIG. 3A, at step/operation 305, the network entity 206/provider system receives the request for additional integration information. Subsequent to receiving the request for additional integration information, the network entity 206/provider system sends the additional integration information at step/operation 307. In some examples, the integration information may be provided automatically and/or manually. For instance, a user may receive the request for additional integration information and provide (e.g., send, transmit) the requested information to the integration computing entity 100. In some examples, the network entity 206/provider system periodically sends updated integration information to the integration computing entity 100 for dynamically updating and/or refining an API model.

Returning to FIG. 3B, at 310 the integration computing entity 100 receives the requested integration information. Then, at step/operation 312, the integration computing entity 100 generates, based at least in part on the one or more integration features, the API model. As detailed herein, an API model may comprise a data object that describes operations/parameters of an API that are configured to facilitate provision of one or more services and may comprise data/information (e.g., computer code) required to generate an API and/or integrate an application or service (e.g., a third-party application). The example API model may further be associated with a particular set of functionalities (e.g., a payment service for facilitating transfer of information between a payment portal and a bank), a written/spoken language (e.g., English), a country (e.g., United States), a computer/software language, a data structure and the like.

Subsequent to step/operation 312, the integration computing entity 100 generates, based at least in part on/corresponding with the API model, an API generation data object at step/operation 314. The API generation data object may be a data object that comprises computer-executable instructions for generating an API and/or for performing integration operations. By way of example, the API generation data object may comprise computer-executable instructions for generating and integrating an API a provider system (e.g., a utility) and a third-party provider system (e.g., a service provider).

Subsequent to step/operation 314, at step/operation 316 the integration computing entity 100 sends (e.g., provides, transmits) the API generation data object. For example, the integration computing entity 100 sends API generation data object to the network entity 206/provider system for execution.

Returning to FIG. 3A, at step/operation 309 the network entity 206/provider system receives the API generation data object. Subsequent to receiving the API generation data object, and based at least in part on the API generation data object, the network entity 206/provider system performs integration operations at step/operation 311. Performing integration operations may comprise generating an API based on the API model/API generation data object. In some examples, performing integration operations may lead to providing or generating one or more API-based data objects. In some embodiments, API-based data objects comprise a set of data and/or instructions that represent a resource of the provider system/platform. For example, service applications can perform actions on one or more API-based data objects. In some embodiments, users may perform actions via a user interface that create or modify API-based data objects. Example API-based data objects include files created and maintained in the provider system, user account information and the like. The network entity 206/provider system may provide (e.g., transmit, send) the one or more API-based data objects for generating user interface data (e.g., on client devices operated by users) for display and/or further operations. In some embodiments, the integration computing entity 100 may dynamically provide data/information for updating the API-based data objects on a continuous or periodic basis or in response to certain triggers and/or requests.

Referring now to FIG. 4, a schematic diagram illustrating an example data structure 400, according to one or more aspects of the currently disclosed invention. As noted herein, the data structure 400 may define one or more data types, one or more data operations that can be performed in relation to each data type and/or a methodology for organizing, storing, retrieving and processing data from a database or repository. As depicted in FIG. 4, the data structure 400 comprises a reference table defining a plurality of data types.

As illustrated, each data structure row is associated with a data field (as depicted, customer number 401A, last name 401B, first name 401C, phone number 401D, address 401E and current balance 401F). Additionally, each data structure 400 column describes attributes (e.g., data type, data format, field size, description, example) associated with the data field. In various embodiments, the integration computing entity 100 may generate a data structure 400 based on analysis of an integration data object (e.g., one or more documents) associated with a provider. The data structure may be utilized to programmatically generate an API model/API that will be capable of processing (e.g., retrieving, utilizing, modifying) data from a database or repository that is associated with another computing entity (e.g., such that a provider system and a third-party system can exchange data via the API). It should be understood that the data structure 400 is not limited to the example provided in FIG. 4 and may be in other forms. For instance, the example data structure may comprise hash tables, arrays, lists or linked lists, stacks, graphs, trees and/or the like.

Figure 5:
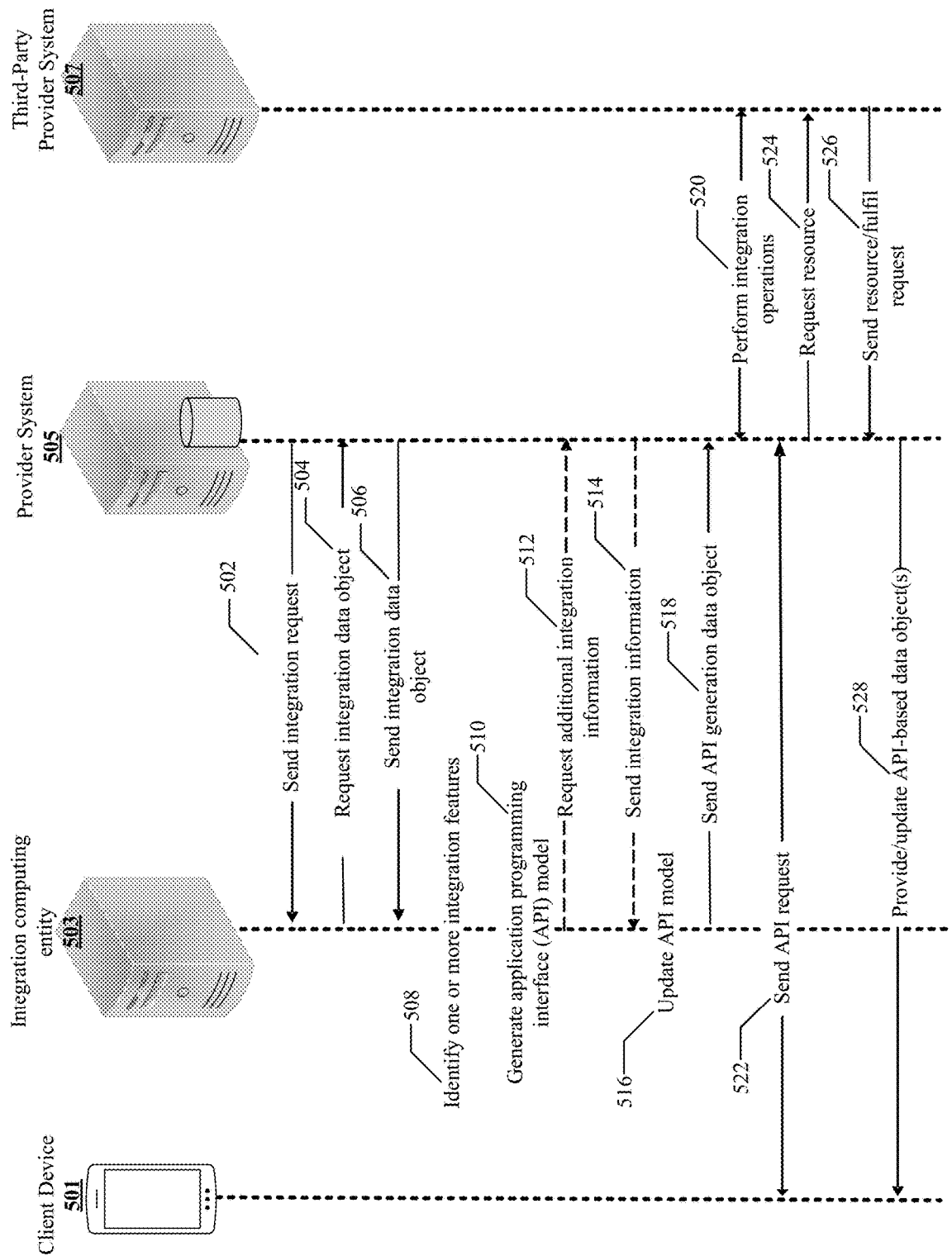
FIG. 5 is a signal diagram illustrating communication between a client device, an integration computing entity, a provider system and a third-party provider system, according to one or more aspects of the currently disclosed invention.

Referring now to FIG. 5, a signal diagram illustrates communication between a client device 501, an integration computing entity 503, a provider system 505 and a third-party provider system 507, according to one or more aspects of the currently disclosed invention. As depicted, at 502, the provider system 505 sends an integration request to the integration computing entity 503. In response to receiving the integration request, at 504, the integration computing entity 503 sends a request to the provider system 505 for an integration data object. Then, at 506, the provider system 505 sends the integration data object to the integration computing entity 503. Upon receiving the integration data object, at 508, the integration computing entity 503 processes the integration data object to identify one or more integration features (e.g., target parameters, API type and/or the like). Next, at 510, the integration computing entity 503 generates an API model based at least in part on the one or more integration features. In some examples, at 512, the integration computing entity 503 sends a request for additional integration information to the provider system 505. In response to receiving the request for additional integration information, the provider system 505 sends integration information at 514. At 516, the integration computing entity 503 updates the API model based at least in part on the received additional information. At 518, the integration computing entity 503 transmits an API generation data object to the provider system 505. At 520, the API generation data object can comprise instructions for programmatically generating an API and/or executing one or more integration operations between the provider system 505 and the third-party provider system 507. At 522, a client device 501 initiates an API request or call via the API. As depicted, at 524, in response to receiving the API request, the provider system 505 requests a resource from the third-party provider system 507. At 526, the third-party provider system 507 sends the resource/fulfils the request. Subsequently, at 528, the provider system provides/updates one or more API-based data objects which may be utilized for generating user interface data via an interface of the client device 501.

Utilizing the above-noted techniques, an API can be programmatically generated and integrated with minimal or no developer input (e.g., extensive testing). Additionally, the integration computing entity is capable of independently updating the API model associated with an API as the system obtains new information from or about the provider system and/or similar provider systems.

In some embodiments, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Methods, apparatuses, and systems are therefore provided in accordance with example embodiments to, for example, are therefore provided in accordance with example embodiments to, for example, programmatically generate and integrate APIs using artificial intelligence/machine learning techniques and the like.

According to a first embodiment, a method is provided. The method can comprise, in response to receiving, by one or more processors, an integration data object, processing, by the one or more processors, and based at least in part on an integration machine learning model, the integration data object in order to identify one or more integration features associated with the integration data object; programmatically generating, by the one or more processors, and based at least in part on the one or more integration features, an application programming interface (API) model corresponding with the integration data object; and generating, by the one or more processors, an API generation data object corresponding with the API model for execution.

In some embodiments, the API generation data object is configured to facilitate generation and/or modification of an API and/or one or more API-based data objects.

In some embodiments, the method can further comprise, subsequent to programmatically generating the API model, periodically sending requests for integration information for updating and/or refining the API model.

In some embodiments, the integration machine learning model comprises a trained supervised machine learning model that is trained based at least in part on a plurality of historical integration data objects.

In some embodiments, the one or more integration features comprises one or more of a data structure, a predicted API type, a country and a language.

In some embodiments, processing, by the one or more processors, the integration data object comprises performing textual analysis on at least a portion of the integration data object.

In some embodiments, the one or more API-based data objects are provided in association with a payment processing service.

According to a second embodiment, an apparatus is provided. The apparatus can comprise a processor; and a memory storing program code, the memory and the program code being configured, with the processor, at least to: in response to receiving an integration data object, process, based at least in part on an integration machine learning model, the integration data object in order to identify one or more integration features associated with the integration data object; programmatically generate, based at least in part on the one or more integration features, an API model corresponding with the integration data object; and generating, by the one or more processors, an API generation data object corresponding with the API model for execution.

In some embodiments, the API generation data object is configured to facilitate generation and/or modification of an API and/or one or more API-based data objects.

In some embodiments, the memory and the program code are further configured, with the processor, at least to: subsequent to programmatically generating the API model, periodically send requests for integration information for updating and/or refining the API model.

In some embodiments, the integration machine learning model comprises a trained supervised machine learning model that is trained based at least in part on a plurality of historical integration data objects.

In some embodiments, the one or more integration features comprises one or more of a data structure, a predicted API type, a country and a language.

In some embodiments, processing the integration data object comprises performing textual analysis on at least a portion of the integration data object.

In some embodiments, the one or more API-based data objects are associated with a payment processing service.

According to a third embodiment, a computer program product is provided. The computer program product can comprise a non-transitory computer readable medium storing program instructions, the program instructions being operable for causing at least: in response to receiving an integration data object, processing, based at least in part on an integration machine learning model, the integration data object in order to identify one or more integration features associated with the integration data object; programmatically generating, based at least in part on the one or more integration features, an API model corresponding with the integration data object; and generating an API generation data object corresponding with the API model for execution.

In some embodiments, the API generation data object is configured to facilitate generation and/or modification of an API and/or one or more API-based data objects.

In some embodiments, the program instructions are further operable for causing at least: subsequent to programmatically generating the API model, periodically sending requests for integration information for updating and/or refining the API model.

In some embodiments, the integration machine learning model comprises a trained supervised machine learning model that is trained based at least in part on a plurality of historical integration data objects.

In some embodiments, the one or more integration features comprises one or more of a data structure, a predicted API type, a country and a language.

In some embodiments, processing the integration data object comprises performing textual analysis on at least a portion of the integration data object.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed, and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

To provide an overall understanding, certain illustrative embodiments have been described; however, it will be understood by one of ordinary skill in the art that systems, apparatuses, and methods described herein can be adapted and modified to provide systems, apparatuses, and methods for other suitable applications and that other additions and modifications can be made without departing from the scope of systems, apparatuses, and methods described herein.

The embodiments described herein have been particularly shown and described, but it will be understood that various changes in form and details may be made. Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems, apparatuses, or methods of the present disclosure.

Conventional terms in the fields of telecommunications, computing entities/devices, payment servicing, artificial intelligence, and machine learning have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Although specific embodiments have been illustrated and described herein, it will be appreciated by those of ordinary skill in the art that any arrangement that is adapted to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," and/or the like are used merely as labels, and are not intended to impose numerical requirements or any relative order of operations or organization on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure and is submitted with the understanding that it will not be used to interpret or limit the scope or meaning of the claims.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

What is claimed is:

1. A computer-implemented method comprising:
receiving, by an apparatus, from a payment processor device, an integration data object, the integration data object being associated with a payment processing request to initiate or facilitate a transaction between a payor device and a payee device, the payor device being associated with a payor, the payee device being associated with a payee, the integration data object comprising one or more of: security requirement information associated with the payment processor device or the payee device, functionalities of the payment processor device or the payee device, a structure or architecture of the payment processor device or the payee device, an account statement, an invoice, a bill, a payment receipt, a payment processor device type, or a payee device type;
processing, using at least one processor of the apparatus, based at least in part on an integration machine learning model, the integration data object in order to identify one or more integration features associated with the integration data object, the one or more integration features comprising one or more of: a predicted application programming interface (API) model type, a country in which the payment processor device or the payee device is operating, computer language capabilities associated with the payment processor device or the payee device, data structure requirements associated with the payment processor device or the payee device, or system protocols associated with the payment processor device or the payee device;

programmatically generating, using the at least one processor, based at least in part on the one or more integration features associated with the integration data object, an API model corresponding to the integration data object;

generating, using the at least one processor, an API generation data object corresponding to the API model; and sending the API generation data object corresponding to the API model to the payment processor device for execution by the payment processor device to generate an API for communication between the payment processor device and the payee device.

2. The computer-implemented method of claim 1, wherein the API generation data object is configured to facilitate generation and/or modification of an API and/or one or more API-based data objects.

3. The computer-implemented method of claim 2, wherein the one or more API-based data objects are associated with a payment processing service.

4. The computer-implemented method of claim 1, further comprising:

subsequent to programmatically generating the API model, periodically sending requests for integration information for updating and/or refining the API model.

5. The computer-implemented method of claim 1, wherein the integration machine learning model comprises a trained supervised machine learning model that is trained based at least in part on a plurality of historical integration data objects.

6. The computer-implemented method of claim 1, wherein processing, using the at least one processor, the integration data object comprises performing textual analysis on at least a portion of the integration data object.

7. An apparatus comprising:
at least one processor; and
at least one memory storing instructions thereon that, when executed by the at least one processor, cause the apparatus to perform at least:
receiving, from a payment processor device, an integration data object, the integration data object being associated with a payment processing request to initiate or facilitate a transaction between a payor device and a payee device, the payor device being associated with a payor, the payee device being associated with a payee, the integration data object comprising one or more of: security requirement information associated with the payment processor device or the payee device, functionalities of the payment processor device or the payee device, a structure or architecture of the payment processor device or the payee device, an account statement, an invoice, a bill, a payment receipt, a payment processor device type, or a payee device type;
processing, based at least in part on an integration machine learning model, the integration data object in order to identify one or more integration features associated with the integration data object, the one or more integration features comprising one or more of: a predicted application programming interface (API) model type, a country in which the payment processor device or the payee device is operating, computer language capabilities associated with the payment processor device or the payee device, data structure requirements associated with the payment processor device or the payee device, or system protocols associated with the payment processor device or the payee device;

programmatically generating, based at least in part on the one or more integration features associated with the integration data object, an API model corresponding to the integration data object;

generating an API generation data object corresponding to the API model; and sending the API generation data object corresponding to the API model to the payment processor device for execution by the payment processor device to generate an API for communication between the payment processor device and the payee device.

8. The apparatus of claim 7, the API generation data object is configured to facilitate generation and/or modification of an API and/or one or more API-based data objects.

9. The apparatus of claim 8, wherein the one or more API-based data objects are associated with a payment processing service.

10. The apparatus of claim 7, wherein the instructions stored on the at least one memory, when executed by the at least one processor, further cause the apparatus to perform at least:

subsequent to programmatically generating the API model, periodically sending requests for integration information for updating and/or refining the API model.

11. The apparatus of claim 7, wherein the integration machine learning model comprises a trained supervised machine learning model that is trained based at least in part on a plurality of historical integration data objects.

12. The apparatus of claim 7, wherein processing the integration data object comprises performing textual analysis on at least a portion of the integration data object.

13. A non-transitory computer readable storage medium storing program instructions that, when executed by at least one processor, cause at least the following:

receiving, from a payment processor device, an integration data object, the integration data object being associated with a payment processing request to initiate or facilitate a transaction between a payor device and a payee device, the payor device being associated with a payor, the payee device being associated with a payee, the integration data object comprising one or more of: security requirement information associated with the payment processor device or the payee device, functionalities of the payment processor device or the payee device, a structure or architecture of the payment processor device or the payee device, an account statement, an invoice, a bill, a payment receipt, a payment processor device type, or a payee device type;

processing, based at least in part on an integration machine learning model, the integration data object in order to identify one or more integration features associated with the integration data object, the one or more integration features comprising one or more of: a predicted application programming interface (API) model type, a country in which the payment processor device or the payee device is operating, computer language capabilities associated with the payment processor device or the payee device, data structure requirements associated with the payment processor device or the payee device, or system protocols associated with the payment processor device or the payee device;

programmatically generating, based at least in part on the one or more integration features associated with the integration data object, an API model corresponding to the integration data object;

generating an API generation data object corresponding to the API model; and sending the API generation data object corresponding to the API model to the payment processor device for execution by the payment processor device to generate an API for communication between the payment processor device and the payee device.

14. The non-transitory computer readable storage medium of claim 13, wherein the API generation data object is configured to facilitate generation and/or modification of an API and/or one or more API-based data objects.

15. The non-transitory computer readable storage medium of claim 14, wherein the one or more API-based data objects are associated with a payment processing service.

16. The non-transitory computer readable storage medium of claim 13, wherein the instructions, when executed by the at least one processor, are further operable for causing at least:

subsequent to programmatically generating the API model, periodically sending requests for integration information for updating and/or refining the API model.

17. The non-transitory computer readable storage medium of claim 13, wherein the integration machine learning model comprises a trained supervised machine learning model that is trained based at least in part on a plurality of historical integration data objects.

18. The non-transitory computer readable storage medium of claim 13, wherein processing the integration data object comprises performing textual analysis on at least a portion of the integration data object.

* * * * *